(12) United States Patent
Seo et al.

(10) Patent No.: US 11,876,737 B2
(45) Date of Patent: Jan. 16, 2024

(54) TRANSMISSION APPARATUS, RECEPTION APPARATUS, AND TRANSMISSION/RECEPTION METHOD FOR OFDM-BASED BROADCASTING SYSTEM

(71) Applicant: Electronics and Telecommunications Research Institute, Daejeon (KR)

(72) Inventors: Jae-Hyun Seo, Daejeon (KR); Sung-Ik Park, Daejeon (KR); Seok-Ki Ahn, Daejeon (KR); Jae-Young Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 336 days.

(21) Appl. No.: 17/214,482

(22) Filed: Mar. 26, 2021

(65) Prior Publication Data
US 2021/0306119 A1    Sep. 30, 2021

(30) Foreign Application Priority Data

Mar. 31, 2020  (KR) ........................ 10-2020-0038980

(51) Int. Cl.
*H04L 5/00*    (2006.01)
*H04L 27/26*   (2006.01)
(Continued)

(52) U.S. Cl.
CPC .......... *H04L 5/0007* (2013.01); *H04L 1/0071* (2013.01); *H04L 27/2666* (2013.01); *H04W 72/0446* (2013.01); *H04W 72/0453* (2013.01)

(58) Field of Classification Search
CPC . H04L 5/0007; H04L 1/0071; H04L 27/2666; H04L 1/0041; H04L 1/0045;
(Continued)

(56) References Cited

U.S. PATENT DOCUMENTS 7,697,411 B2 *  4/2010  Negishi .............. H04N 21/4382
                                                         370/208
9,246,806 B2    1/2016  Seo et al.
(Continued)

FOREIGN PATENT DOCUMENTS

EP    2224635 A2 *  9/2010  ............ H03M 13/27
JP    5485304 B2 *  5/2014
(Continued)

*Primary Examiner* — Mounir Moutaouakil
(74) *Attorney, Agent, or Firm* — William Park & Associates Ltd.

(57) ABSTRACT

Disclosed herein are a transmission apparatus, a reception apparatus and a transmission/reception method for an OFDM-based broadcasting system. The transmission apparatus includes multiple transmission frame generation units for generating multiple transmission frames from transmission data, an extended frame combination unit for generating an extended frame by combining the multiple transmission frames so that the multiple transmission frames are adjacent to each other based on a frequency, an extended OFDM modulation unit for modulating the extended frame and then generating a modulated signal, and a frequency up-conversion unit for performing frequency up-conversion on the modulated signal and generating a transmission signal, wherein each of the transmission frame generation units includes a data input unit for receiving transmission data, a channel-encoding unit for encoding the received transmission data and generating encoded data, and a framing and interleaving unit for framing and interleaving the encoded data and generating a transmission frame.

16 Claims, 11 Drawing Sheets

(51) Int. Cl.
*H04W 72/0453* (2023.01)
*H04W 72/0446* (2023.01)
*H04L 1/00* (2006.01)

(58) Field of Classification Search
CPC ... H04L 27/2602; H04L 5/023; H04L 1/0006;
H04L 27/2627; H04W 72/0446; H04W
72/0453; H04H 20/86
See application file for complete search history.

(56) References Cited

U.S. PATENT DOCUMENTS

| | | | |
|---|---|---|---|
| 10,462,791 B2 | 10/2019 | Yu et al. | |
| 10,715,861 B2 | 7/2020 | Stewart | |
| 2015/0341586 A1* | 11/2015 | Allison, III | H04N 5/40 |
| | | | 348/724 |
| 2019/0356446 A1 | 11/2019 | Kim et al. | |
| 2020/0178121 A1* | 6/2020 | Simon | H04H 20/18 |
| 2020/0288325 A1* | 9/2020 | Simon | H04W 76/40 |

FOREIGN PATENT DOCUMENTS

| | | | |
|---|---|---|---|
| JP | 6579748 B2 | 9/2019 | |
| KR | 100856389 B1 | 9/2008 | |
| KR | 1020090042763 A | 4/2009 | |
| KR | 1020170129137 A | 11/2017 | |
| WO | 2016098302 A1 | 6/2016 | |

\* cited by examiner

TRANSMISSION APPARATUS, RECEPTION APPARATUS, AND TRANSMISSION/RECEPTION METHOD FOR OFDM-BASED BROADCASTING SYSTEM

CROSS REFERENCE TO RELATED APPLICATION

This application claims the benefit of Korean Patent Application No. 10-2020-0038980, filed Mar. 31, 2020, which is hereby incorporated by reference in its entirety into this application.

BACKGROUND OF THE INVENTION

1. Technical Field

The present invention relates generally to a transmission apparatus and a reception apparatus for an OFDM-based broadcasting system and a transmission/reception method for the OFDM-based broadcasting system.

2. Description of the Related Art

A conventional Orthogonal Frequency-Division Multiplexing (OFDM)-based broadcasting system supports various transmission parameters in a given transmission channel or frequency bandwidth. For example, since the Advanced Television Systems Committee (ATSC) 3.0 broadcasting system supports transmission multiplexing technology such as time-division multiplexing, frequency-division multiplexing, and layered division multiplexing, transmission capacity may be divided in accordance with the purpose, and then data may be transmitted.

However, because a transmission channel and a frequency bandwidth are defined, it is not easy to transmit data corresponding to divided transmission capacity at the same time by applying the multiplexing technology. The reason for this is that the only method for increasing the transmission capacity within a given transmission channel or frequency bandwidth is a multiple-input multiple-output (MIMO) scheme using multiple antennas. However, in the case of the MIMO scheme, replacement of a transmission antenna and a reception antenna is required.

In order to solve this problem, the ATSC 3.0 broadcasting system also supports a channel-bonding scheme for additionally extending a transmission channel or a frequency bandwidth by one channel or one bandwidth. However, in the case of the channel-bonding scheme, a maximum of two transmission channels or frequency bandwidths may be used, and thus transmission capacity may only be doubled within existing standards.

Therefore, there is required technology that can solve the problems with the conventional technology, can realize reverse compatibility with existing broadcasting standards, and can increase the transmission capacity without limitation.

PRIOR ART DOCUMENTS

Patent Documents (Patent Document 1) Korean Patent Application Publication No. 10-2017-0129137 (Nov. 24, 2017)

SUMMARY OF THE INVENTION

Accordingly, the present invention has been made keeping in mind the above problems occurring in the prior art, and an object of the present invention is to provide a transmission/reception apparatus and method for increasing transmission capacity without limitation while guaranteeing reverse compatibility with an existing receiver in an OFDM-based broadcasting system.

Another object of the present invention is to provide a transmission/reception apparatus and method for an OFDM-based broadcasting system, which allow an existing receiver to be provided with existing transmission capacity and also allow a new receiver to be provided with added transmission capacity in addition to the existing transmission capacity while providing a method that is capable of increasing transmission capacity based on ATSC 3.0 which is a next-generation broadcasting system.

In accordance with an aspect of the present invention to accomplish the above objects, there is provided a transmission apparatus for an Orthogonal Frequency Division Multiplexing (OFDM)-based broadcasting system, including multiple transmission frame generation units for generating multiple transmission frames from multiple pieces of transmission data; an extended frame combination unit for generating an extended frame by combining the multiple transmission frames so that the multiple transmission frames are adjacent to each other based on a frequency; an extended OFDM modulation unit for modulating the extended frame and then generating a modulated signal; and a frequency up-conversion unit for performing frequency up-conversion on the modulated signal and then generating a transmission signal, wherein each of the transmission frame generation units includes a data input unit for receiving a corresponding one of the multiple pieces of transmission data; a channel-encoding unit for encoding the received transmission data and then generating encoded data; and a framing and interleaving unit for framing and interleaving the encoded data and then generating a transmission frame.

The multiple transmission frame generation units may include an existing channel transmission frame generation unit for generating an existing channel transmission frame; a high channel transmission frame generation unit for generating a high channel transmission frame; and a low channel transmission frame generation unit for generating a low channel transmission frame to be paired with the high channel transmission frame.

The extended frame combination unit may be configured to generate the high channel transmission frame to be located in a portion that is adjacent to the existing channel transmission frame with respect to a frequency and that has a frequency higher than a frequency of a frequency band of the existing channel transmission frame, and generate the low channel transmission frame to be located in a portion that is adjacent to the existing channel transmission frame with respect to a frequency and that has a frequency lower than a frequency of the frequency band of the existing channel transmission frame.

The extended OFDM modulation unit may add subcarriers of the modulated signal to a guard band of the existing channel transmission frame.

The extended OFDM modulation unit may increase a number of subcarriers of signals modulated from the high channel transmission frame and the low channel transmission frame by a ratio of a frequency guard band to an effective frequency band of the existing channel transmission frame.

The extended frame combination unit may be configured to fill a preamble time interval and a bootstrap time interval of the high channel transmission frame with dummy modulation values, and fill a preamble time interval and a bootstrap time interval of the low channel transmission frame with dummy modulation values.

The extended frame combination unit may be configured to fill a bootstrap time interval of the high channel transmission frame with dummy modulation values, and fill a bootstrap time interval of the low channel transmission frame with dummy modulation values.

The multiple transmission frame generation units may further include one or more high channel extended transmission frame generation units for generating one or more high channel extended transmission frames; and one or more low channel extended transmission frame generation units for generating one or more low channel extended transmission frames to be paired with the one or more high channel extended transmission frames.

The extended frame combination unit may be configured to generate the one or more high channel extended transmission frames to be sequentially located in portions that are adjacent to the high channel transmission frame with respect to a frequency and that have frequencies higher than a frequency of a frequency band of the high channel transmission frame, and generate the one or more low channel extended transmission frames to be sequentially located in portions that are adjacent to the low channel transmission frame with respect to a frequency and that have frequencies lower than a frequency of a frequency band of the lower channel transmission frame.

In accordance with another aspect of the present invention to accomplish the above objects, there is provided a reception apparatus for an OFDM-based broadcasting system, including a frequency down-conversion unit for performing frequency down-conversion on a signal received from a reception antenna; an extended OFDM demodulation unit for demodulating a frequency down-converted signal and then generating a demodulated extended frame; an extended frame separation unit configured to separate the demodulated extended frame into multiple transmission frames based on a frequency band; and multiple reception data reconstruction units for reconstructing the multiple transmission frames into multiple pieces of reception data, wherein each of the multiple reception data reconstruction units includes a deframing and deinterleaving unit for deframing and deinterleaving a corresponding transmission frame and then generating deframed data; a channel-decoding unit for decoding the deframed data and then generating decoded data, and a data output unit for outputting the decoded data as reception data.

In accordance with a further aspect of the present invention to accomplish the above objects, there is provided a transmission/reception method for an OFDM-based broadcasting system, including generating multiple transmission frames from multiple pieces of transmission data; generating an extended frame by combining the multiple transmission frames so that the multiple transmission frames are adjacent to each other based on a frequency; modulating the extended frame and then generating a modulated signal; and performing frequency up-conversion on the modulated signal and then generating a transmission signal, wherein generating each of the multiple transmission frames includes receiving a corresponding one of the multiple pieces of transmission data; encoding the received transmission data and then generating encoded data; and framing and interleaving the encoded data and then generating a transmission frame.

Generating the multiple transmission frames may include generating an existing channel transmission frame; generating a high channel transmission frame; and generating a low channel transmission frame to be paired with the high channel transmission frame.

Generating the extended frame may include generating the high channel transmission frame to be located in a portion that is adjacent to the existing channel transmission frame with respect to a frequency and that has a frequency higher than a frequency of a frequency band of the existing channel transmission frame, and generating the low channel transmission frame to be located in a portion that is adjacent to the existing channel transmission frame with respect to a frequency and that has a frequency lower than a frequency of the frequency band of the existing channel transmission frame.

Generating the modulated signal may be configured to add subcarriers of the modulated signal to a guard band of the existing channel transmission frame.

Generating the modulated signal may be configured to increase a number of subcarriers of signals modulated from the high channel transmission frame and the low channel transmission frame by a ratio of a frequency guard band to an effective frequency band of the existing channel transmission frame.

Generating the extended frame may include filling a preamble time interval and a bootstrap time interval of the high channel transmission frame with dummy modulation values, and filling a preamble time interval and a bootstrap time interval of the low channel transmission frame with dummy modulation values.

Generating the extended frame may include filling a bootstrap time interval of the high channel transmission frame with dummy modulation values, and filling a bootstrap time interval of the low channel transmission frame with dummy modulation values.

Generating the multiple transmission frames may further include generating one or more high channel extended transmission frames; and generating one or more low channel extended transmission frames to be paired with the one or more high channel extended transmission frames.

Generating the extended frame may include generating the one or more high channel extended transmission frames to be sequentially located in portions that are adjacent to the high channel transmission frame with respect to a frequency and that have frequencies higher than a frequency of a frequency band of the high channel transmission frame, and generating the one or more low channel extended transmission frames to be sequentially located in portions that are adjacent to the low channel transmission frame with respect to a frequency and that have frequencies lower than a frequency of a frequency band of the lower channel transmission frame.

The transmission/reception method may further include performing frequency down-conversion on a signal received from an antenna demodulating a frequency down-converted signal and then generating a demodulated extended frame; separating the demodulated extended frame into multiple transmission frames based on a frequency band; and reconstructing the multiple transmission frames into multiple pieces of reception data, wherein reconstructing the multiple transmission frames into the multiple pieces of reception data may includes deframing and deinterleaving a corresponding transmission frame and then generating deframed data; decoding the deframed data and then generating decoded data; and outputting the decoded data as reception data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
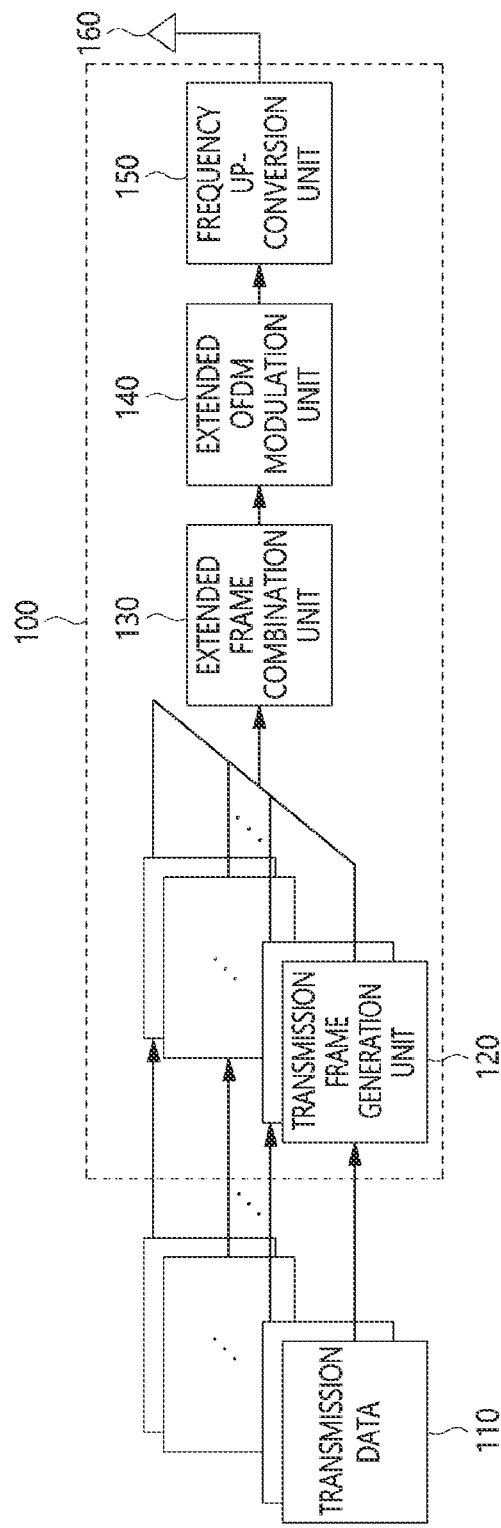
FIG. 1 is a block diagram illustrating an example of a transmission apparatus for an OFDM-based broadcasting system according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not interpreted as having ideal or excessively formal meanings unless they are definitely defined in the present specification.

Hereinafter, a transmission apparatus and a reception apparatus for an Orthogonal Frequency Division Multiplexing (OFDM)-based broadcasting system and a transmission/reception method for the OFDM-based broadcasting system according to embodiment will be described in detail with reference to FIGS. 1 to 12.

FIG. 1 is a block diagram illustrating an example of a transmission apparatus 100 of an OFDM-based broadcasting system according to an embodiment.

Referring to FIG. 1, the transmission apparatus 100 of the OFDM-based broadcasting system according to the embodiment may include multiple transmission frame generation units 120, an extended frame combination unit 130, an extended OFDM modulation unit 140, and a frequency up-conversion unit 150.

The multiple transmission frame generation units 120 generate transmission frames from multiple pieces of transmission data 110. The extended frame combination unit 130 generates an extended frame by closely combining the multiple transmission frames with respect to frequency. The extended OFDM modulation unit 140 generates a modulated signal by modulating the extended frame. The frequency up-conversion unit 150 generates a transmission signal by performing frequency up-conversion on the modulated signal. The signal generated in this way is provided to and transmitted from a transmission antenna 160.

The multiple pieces of transmission data 110 are respectively input to the multiple transmission frame generation units 120. Each of the transmission frame generation units 120 includes a data input unit, a channel-encoding unit, and a framing and interleaving unit. Here, respective transmission frame generation units may be configured the same as each other, or may be independently configured depending on the features of transmission frames to be generated. Further, the data input unit receives transmission data that is desired to be transmitted. The channel-encoding unit encodes the received transmission data and then generates encoded data. The framing and interleaving unit generates a transmission frame by framing and interleaving the encoded data.

The multiple transmission frame generation units 120 may generate an existing channel transmission frame generation unit for generating an existing channel transmission frame, a high channel transmission frame generation unit for generating a high channel transmission frame, and a low channel transmission frame generation unit for generating a low channel transmission frame that is paired with the high channel transmission frame.

The existing channel transmission frame is a transmission frame that is transmitted based on existing broadcasting standards. The extended transmission frame is a transmission frame in which the transmission capacity is added to and extends the existing transmission capacity depending on the transmission/reception method proposed in the present invention, and is configured such that a high channel transmission frame and a low channel transmission frame are paired. Here, each of the high channel transmission frame and the low channel transmission frame is configured such that the size of one transmission frame is equal to that of one existing channel transmission frame with respect to a time unit, and such that the number of subframes constituting one transmission frame needs only to be equal to the number of subframes constituting the existing channel transmission frame. Therefore, the frequency bands of the high channel transmission frame and the low channel transmission frame do not need to be equal to each other, and may be designated separately from the existing channel transmission frame.

The multiple transmission frames generated by the multiple transmission frame generation units are input to the extended frame combination unit 130, and are used to generate an extended frame. The extended frame combination unit 130 may generate a high channel transmission frame to be located in a portion that has a frequency higher than that of a frequency band of the existing channel transmission frame and that is adjacent to the existing channel transmission frame with respect to frequency, and may generate a low channel transmission frame to be located in a portion that has a frequency lower than that of the frequency band of the existing channel transmission frame and that is adjacent to the existing channel transmission frame with respect to frequency.

Further, the extended frame combination unit 130 may fill both a preamble time interval and a bootstrap time interval of the high channel transmission frame with dummy modulation values, and may fill both a preamble time interval and a bootstrap time interval of the low channel transmission frame with dummy modulation values. In this case, the preamble of the existing channel transmission frame may control all of the existing channel transmission frame, the high channel transmission frame, and the low channel transmission frame.

The extended frame generated in this way has a form in which the high channel transmission frame and the low channel transmission frame are added to the existing channel transmission frame. The existing channel transmission frame is composed of a bootstrap, a preamble, and K subframes 1 to K. The high channel transmission frame is composed of K subframes U 1 to K_U and the bootstrap time interval and the preamble time interval are filled with dummy modulation values. Furthermore, the low channel transmission frame is also composed of K subframe L (1 to K_L), and the bootstrap time interval and the preamble time interval are filled with dummy modulation values. Here, K, K_U, and K_L may be identical values equal to or greater than 1.

Frequency bands of the high channel transmission frame and the low channel transmission frame, which are added due to the extension of the bandwidth, may be identical to or different from the frequency band of the existing channel transmission frame. Here, control of the subframes U (1 to K_U) and subframes L (1 to K_L) is performed in the preamble of the existing channel transmission frame, and the preamble may be extended while guaranteeing reverse compatibility with an existing ATSC 3.0 receiver. For example, when the size of an extended bandwidth is set to 6 MHz for the existing channel, is set to 3 MHz for a high channel, and is set to 3 MHz for a low channel, a transmission bandwidth may be extended by a total of 6 MHz, and the total transmission capacity may be twice that of the existing channel transmission frame when the existing and extended transmission frames have the same transmission parameters (e.g., a modulation factor, a channel-coding rate, the size of a guard band, etc.). When the size of the extended bandwidth is set to 6 MHz for the high channel and is set to 6 MHz for the low channel with respect to the existing channel in the above example, a transmission bandwidth may be extended by a total of 12 MHz. Further, when the size of the extended bandwidth is set to 12 MHz for the high channel and is set to 6 MHz for the low channel, the transmission bandwidth may be extended by a total of 18 MHz. In this way, according to the method proposed in the present invention, the transmission bandwidth may be independently and freely extended regardless of the size of the bandwidth of the existing channel.

The extended frame combination unit 130 may fill the bootstrap time interval of the high channel transmission frame with dummy modulation values, and may fill the bootstrap time interval of the low channel transmission frame with dummy modulation values. In this case, the preamble of each transmission frame controls subframes of the corresponding transmission frame.

The extended frame generated in this way also has a form in which the high channel transmission frame and the low channel transmission frame are added to the existing channel transmission frame. First, the high channel transmission frame is composed of a preamble U and K subframes U (1 to K_U) and a bootstrap time interval is filled with dummy modulation values. Further, the low channel transmission frame is composed of a preamble L and K subframes L (1 to K_L) and a bootstrap time interval is filled with dummy modulation values. Here, K. K_U, and K_L may be identical values equal to or greater than 1. Here, the added preamble U and preamble L may be controlled by extending the bootstrap of the existing channel transmission frame, and the extended bootstrap may guarantee reverse compatibility with the existing ATSC 3.0 receiver. Further, the preamble U controls the subframes U (1 to K_U), and the preamble L controls the subframes L (1 to K_L). By means of this method, the transmission bandwidth may be independently and freely extended regardless of the size of the bandwidth of the existing channel.

The extended OFDM modulation unit 140 modulates the extended frame, generated by the extended frame combination unit 130, in conformity with an OFDM signal. The signal modulated in this way is composed of multiple subcarriers based on the frequency.

The ATSC 3.0 or OFDM-based broadcasting system is composed of multiple subcarriers from the standpoint of frequency. As the features of the OFDM system, Orthogonal Frequency Division Multiplexing (OFDM) is applied, and data is transmitted after a frequency band is divided into narrowband subcarriers (subchannels) through a Fourier transform. In the case of an 8K transmission mode, 8196 subcarriers having a Fast Fourier Transform (FFT) size are generated within the transmission bandwidth. In detail, the 81% subcarriers are divided into effective subcarriers on which data is transmitted and null subcarriers on which data is not actually transmitted. In the 8K transmission mode of the ATSC 3.0 system, the numbers of effective subcarriers, among a total of 8196 subcarriers, are 6913, 6817, 6721, 6625, and 6529, respectively, and five types of effective subcarriers are provided. Accordingly, of the total transmission bandwidth of 6 MHz, frequency bandwidths corresponding to effective subcarriers on which actual data is transmitted are 5.832, 5.751, 5.670, 5.589, and 5.508 MHz, respectively. The remaining null subcarriers, other than effective subcarriers, among all of the subcarriers, correspond to guard bands. For example, when the frequency bandwidth of valid (effective) data is 5.832 MHz, the bandwidth of the guard bands is 0.164 MHz (=0.084 MHz× 2). When three existing transmission channels are used, the total bandwidth of the transmission channels is 6×3=18

MHz, the total bandwidth of effective data is 5.832×3=17.496 MHz, and the total bandwidth of the guard bands is 0.084×6=0.504 MHz.

However, in the OFDM-based broadcasting system according to the present invention, the extended OFDM modulation unit 140 may add the subcarriers of the modulated signal to the frequency guard bands of the existing channel transmission frame. Therefore, the frequency guard bands are not required in the existing transmission bandwidth, and only one frequency guard band is required in each of a high channel transmission bandwidth and a low channel transmission bandwidth. For example, when the frequency bandwidth of effective data of the existing transmission channel is 5.832 MHz and the bandwidth of each of the guard bands on both sides of the existing transmission channel is 0.084 MHz, the total bandwidth of the guard bands is 0.084×2=0.168 MHz. Therefore, the frequency bandwidth of effective subcarriers on which actual data is transmitted is 17.832 MHz, and is increased by 0.336 MHz compared to the case where three existing transmission channels are used.

Although the transmission apparatus for the OFDM-based broadcasting system according to the present invention extends the transmission capacity and transmits data in this way, an existing receiver may filter and receive only signals for the existing transmission channel using an existing receiver filter, thus maintaining reverse compatibility.

Further, since effective subcarriers can also be located in the guard bands, as described above, the extended OFDM modulation unit 140 may increase the number of subcarriers of the signals modulated from the high channel transmission frame and the low channel transmission frame by the ratio of the frequency guard bands to the effective frequency band of the existing channel transmission frame.

For example, in the case where the transmission capacity is extended by adding a high channel and a low channel, each having a bandwidth of 6 MHz, to an existing transmission channel having a transmission bandwidth of 6 MHz and an effective frequency bandwidth of 5.832 MHz, the total transmission bandwidth is 18 MHz, the effective bandwidth is 17.832 MHz, and the bandwidth of guard bands is 0.168 MHz. That is, compared to the case where three existing transmission channels are used, the size of the total guard band size can be reduced by 0.168×2=0.336 MHz, and thus effective subcarriers corresponding to the 0.336 MHz may be added. When the number of effective subcarriers of the existing transmission channel is 6913, subcarriers can be increased by the ratio of the frequency guard bands to the effective frequency band, that is, 0.168/5.832, for the high channel and the low channel. Therefore, in the case of the 8K transmission mode of the ATSC 3.0 system, a number of effective subcarriers corresponding to a maximum of 398 (=6913×0.168/5.832×2) may be added.

The extended frame combination unit may generate one or more high channel extended transmission frames to be sequentially located in portions that have frequencies higher than that of a frequency band of the high channel transmission frame and that are adjacent to the high channel transmission frame with respect to frequency, and may generate one or more low channel extended transmission frames to be sequentially located in portions that have frequencies lower than that of a frequency band of the low channel transmission frame and that are adjacent to the low channel transmission frame with respect to frequency. That is, when it is desired to increase the transmission capacity more than twice, high channel extended transmission frames and low channel extended transmission frames are further added, the high channel extended transmission frames are located adjacent to a frequency higher than the high channel portion, and the low channel extended transmission frames may be located adjacent to a frequency lower than the low channel portion. Furthermore, the number of high channel extended transmission frames and low channel extended transmission frames may be one or more. Whenever the number of added transmission frames increases, the transmission capacity may be freely increased to an extent required by the system and the user by repeating an operation of sequentially extending and locating the frequencies so that a high-frequency portion and a low-frequency portion are paired.

Further, as described above, the signal modulated by the extended OFDM modulation unit 140 is frequency up-converted by the frequency up-conversion unit 150, and the signal is then transmitted though the transmission antenna 160.

Figure 2:
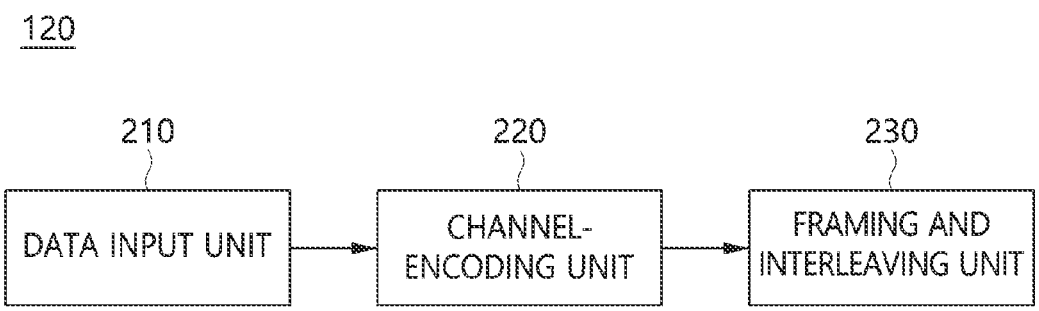
FIG. 2 is a block diagram illustrating an example of the transmission frame generation unit illustrated in FIG. 1.

FIG. 2 is a block diagram illustrating an example of each transmission frame generation unit 120 illustrated in FIG. 1.

Referring to FIG. 2, the transmission frame generation unit 120 includes a data input unit 210, a channel-encoding unit 220, and a framing and interleaving unit 230.

The data input unit 210 receives transmission data desired to be transmitted. The channel-encoding unit 220 encodes the received transmission data and generates encoded data. The framing and interleaving unit 230 generates a transmission frame by framing and interleaving the encoded data.

The respective transmission frame generation units may be configured the same as each other, and may be independently configured depending on the features of the transmission frames to be generated. Accordingly, the channel-encoding units 220 and the framing and interleaving units 230 belonging to respective transmission frame generation units may be configured the same as each other, or may be independently configured for respective transmission frame generation units.

Figure 3:
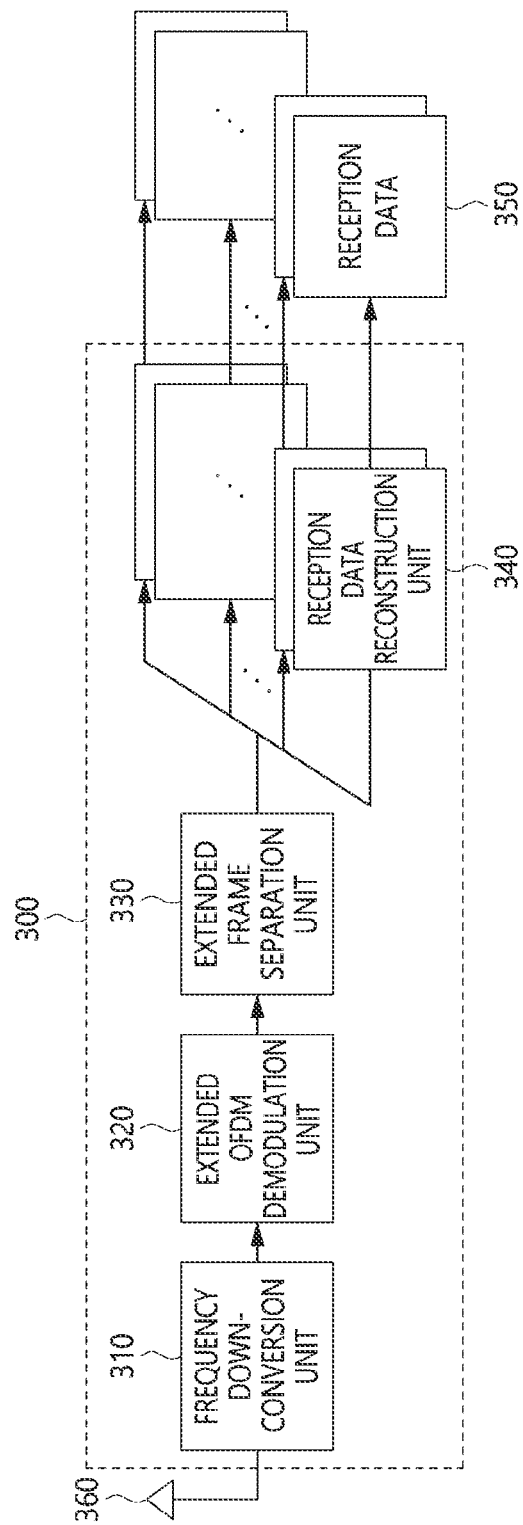
FIG. 3 is a diagram illustrating an example of a reception apparatus for an OFDM-based broadcasting system according to an embodiment.

FIG. 3 is a diagram illustrating an example of a reception apparatus 300 of an OFDM-based broadcasting system according to an embodiment.

Referring to FIG. 3, the reception apparatus 300 of the OFDM-based broadcasting system according to the embodiment includes a frequency down-conversion unit 310, an extended OFDM demodulation unit 320, an extended frame separation unit 330, and multiple reception data reconstruction units 340.

The frequency down-conversion unit 310 performs frequency down-conversion on a signal received from a reception antenna. The extended OFDM demodulation unit 320 demodulates the frequency down-converted signal and generates a demodulated extended frame. The extended frame separation unit 330 separates the demodulated extended frame into multiple transmission frames based on a frequency band. The multiple reception data reconstruction units 340 reconstruct the multiple transmission frames into multiple pieces of reception data 350.

Each of the reception data reconstruction units 340 includes a deframing and deinterleaving unit, a channel-decoding unit, and a data output unit. The deframing and deinterleaving unit receives, as input, a corresponding one of the transmission frames, separated by the extended frame separation unit 330, performs deframing and deinterleaving on the corresponding transmission frame, and then generates deframed data. The channel-decoding unit decodes the deframed data and then generates decoded data. The data output unit outputs the decoded data as the corresponding reception data 350.

Here, the frequency down-converted signal generated by the frequency down-conversion unit 310 corresponds to the signal modulated by the extended OFDM modulation unit of the transmission apparatus for the OFDM-based broadcasting system according to the embodiment. That is, the frequency down-converted signal is composed of multiple subcarriers based on the frequency, effective subcarriers, among the subcarriers, may be added to the frequency guard bands of an existing channel transmission frame, and the number of subcarriers of signals modulated from the high channel transmission frame and the low channel transmission frame may be increased by the ratio of the frequency guard bands to the effective frequency band of the existing channel transmission frame.

Further, the extended frame demodulated by the extended OFDM demodulation unit 320 corresponds to the extended frame generated by the extended frame combination unit of the transmission apparatus for the OFDM-based broadcasting system. That is, the demodulated extended frame may have a form in which a high channel transmission frame and a low channel transmission frame are added to the existing channel transmission frame. Alternatively, the demodulated extended frame may have a form in which one or more high channel extended transmission frames and low channel extended transmission frames are further added.

Therefore, the extended frame separation unit 330 separates an existing channel transmission frame, a high channel transmission frame, a low channel transmission frame, one or more high channel extended transmission frames, and one or more low channel extended transmission frames from the demodulated extended frame based on the frequency band. The transmission frames separated in this way are input to respective reception data reconstruction units 330, and are then reconstructed into reception data.

Figure 4:
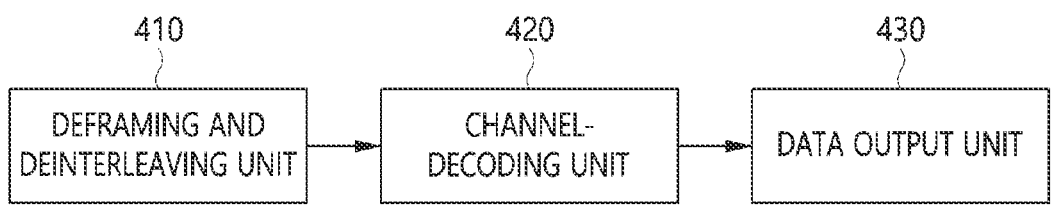
FIG. 4 is a diagram illustrating an example of the reception data reconstruction unit illustrated in FIG. 3.

FIG. 4 is a block diagram illustrating an example of each reception data reconstruction unit 340 illustrated in FIG. 3.

Referring to FIG. 4, the reception data reconstruction unit 340 includes a deframing and deinterleaving unit 410, a channel-decoding unit 420, and a data output unit 430.

The deframing and deinterleaving unit 410 receives, as input, a corresponding one of transmission frames, separated by the extended frame separation unit, performs deframing and deinterleaving on the corresponding transmission frame, and then generates deframed data. The channel-decoding unit 420 decodes the deframed data and then generates decoded data. The data output unit 430 outputs the decoded data as corresponding reception data 350.

Respective reception data reconstruction units may be configured the same as each other in accordance with the transmission frame generation units of the transmission apparatus for the OFDM-based broadcasting system, or may be independently configured depending on the features of the received transmission frames. Accordingly, the deframing and deinterleaving units 410 and the channel-decoding units 420, belonging to respective reception data reconstruction units, may be configured the same as each other, or may be independently configured for respective transmission frame generation units.

Figure 5:
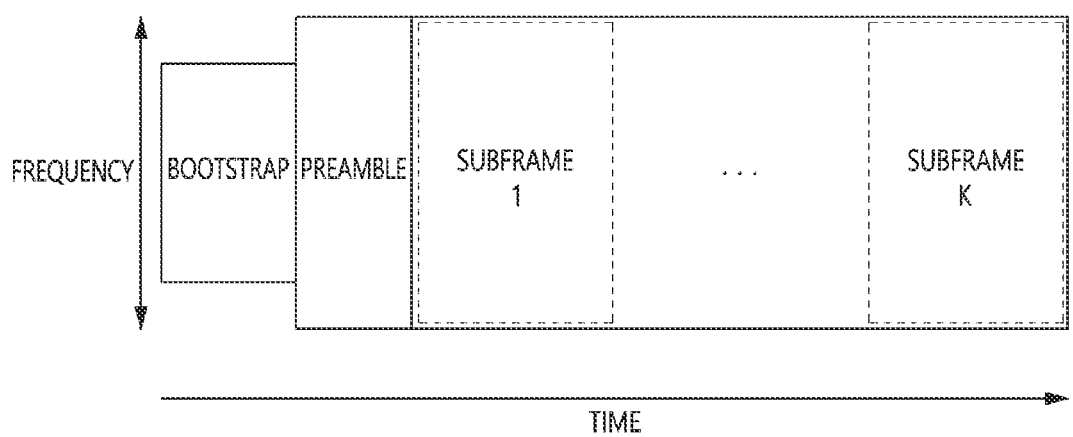
FIG. 5 is a diagram illustrating the structure of a transmission frame in a conventional ATSC 3.0 broadcasting system.

FIG. 5 is a diagram illustrating the structure of a transmission frame of a conventional ATSC 3.0 broadcasting system.

In FIG. 5, the horizontal axis indicates time and the vertical axis indicates frequency. Referring to FIG. 5, a time resource forms one transmission frame and a frequency resource indicates one transmission channel or frequency bandwidth. In particular, FIG. 5 shows an example of a transmission frame in ATSC 3.0, wherein the transmission frame is composed of a bootstrap, a preamble, and K subframes. Here, K is a value equal to or greater than 1. In ATSC 3.0, the frequency bandwidth is one of 6, 7, and 8 MHz, and the bootstrap is 4.5 MHz which is uniform.

Figure 6:
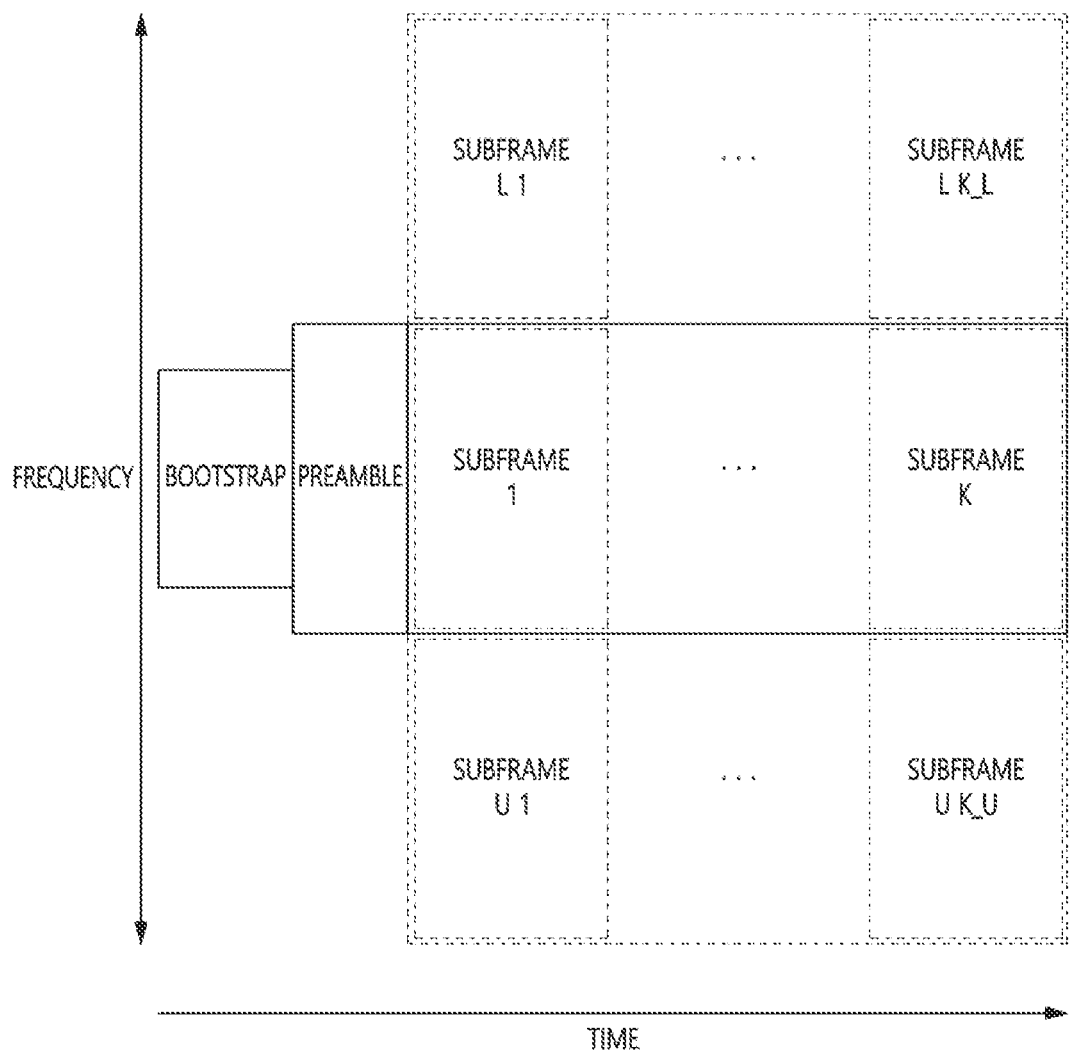
FIG. 6 is a diagram illustrating an example of the structure of a transmission frame of an OFDM-based broadcasting system according to an embodiment.

FIG. 6 is a diagram illustrating an example of the structure of a transmission frame of an OFDM-based broadcasting system according to an embodiment.

In FIG. 6, the horizontal axis indicates time and the vertical axis indicates frequency. Referring to FIG. 6, a time resource forms one transmission frame, and a frequency resource is configured to include one existing transmission channel and extended transmission channels. The bootstrap has a bandwidth of 4.5 MHz, which is identical to that of the transmission frame in the conventional broadcasting system, and the preamble and the subframes in the existing transmission channel have the same bandwidth.

The broadcasting system having increased transmission capacity according to the present invention has a form in which a high-channel portion and a low-channel portion are added to the existing channel. First, the high-channel portion may be composed of subframes U (1 to K_U), and a bootstrap time interval and a preamble time interval may be filled with dummy modulation values. Further, the low-channel portion may be composed of subframes L (1 to K_L), and a bootstrap time interval and a preamble time interval may be filled with dummy modulation values. Here, K, K_U, and K_L may be identical values equal to or greater than 1. The bandwidth of the high channel and the low channel that are added due to the extension of the bandwidth may be identical to or different from that of the existing transmission channel (6 MHz). Here, control of the subframes U (1 to K_U) and subframes L (1 to K_L) is performed in a preamble, which may be extended while guaranteeing reverse compatibility with existing ATSC 3.0 receivers. For example, when the size of the extended bandwidth is set to 3 MHz for a high channel and is set to 3 MHz for a low channel, with respect to the existing channel, transmission bandwidth may be extended by a total of 6 MHz, and the total transmission capacity may be twice that of the existing channel transmission frame when the existing and extended transmission frames have the same transmission parameters. When the size of the extended bandwidth is set to 6 MHz for a high channel and is set to 6 MHz for a low channel, with respect to the existing channel as in the case of the above example, transmission bandwidth may be extended by a total of 12 MHz. Further, when the size of the extended bandwidth is set to 12 MHz for a high channel and is set to 6 MHz for a low channel, transmission bandwidth may be extended by a total of 18 MHz. In this way, according to the method proposed in the present invention, the transmission bandwidth may be independently and freely extended regardless of the size of the bandwidth of the existing channel.

Figure 7:
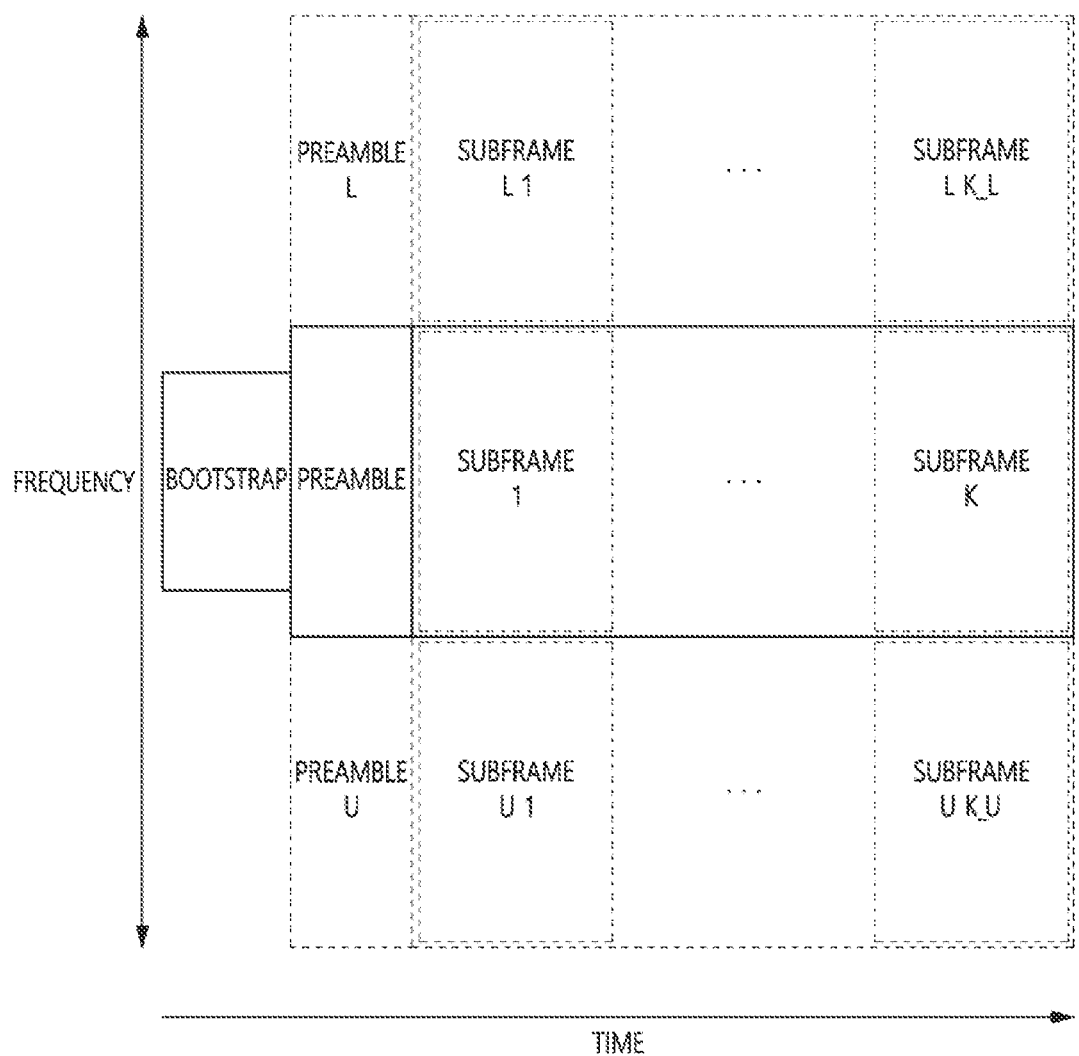
FIG. 7 is a diagram illustrating another example of the transmission frame of the OFDM-based broadcasting system according to an embodiment.

FIG. 7 is a diagram illustrating another example of the structure of a transmission frame of an OFDM-based broadcasting system according to an embodiment.

The horizontal axis indicates time and the vertical axis indicates frequency. A time resource forms one transmission frame, and a frequency resource is configured to include one existing transmission channel and extended transmission channels. The bootstrap has a bandwidth of 4.5 MHz which is identical to that of the transmission frame in the conventional broadcasting system, and the preamble and the subframes (1 to K) in the existing transmission channel (6 MHz) have the same form. The broadcasting system having increased transmission capacity according to the present invention has a form in which a high-channel portion and a low-channel portion are added to the existing channel. First, the high-channel portion may be composed of a preamble U and subframes U (1 to K_U), and a bootstrap time interval may be filled with dummy modulation values. Further, the low-channel portion may be composed of a preamble L and subframes L (1 to K_L), and a bootstrap time interval may be filled with dummy modulation values. Here, K, K_U, and K_L may be identical values equal to or greater than 1. The bandwidth of the high channel and the low channel that are added due to the extension of the bandwidth may be identical to or different from the existing transmission channel (6 MHz). Here, the added preamble U and the added preamble L may be controlled by extending the bootstrap, and the extended bootstrap guarantees reverse compatibility with the existing ATSC 3.0 receiver. The preamble U controls the subframes U (1 to K_U), and the preamble L controls the subframes L (1 to K_L). For example, when the size of the extended bandwidth is set to 3 MHz for a high channel and is set to 3 MHz for a low channel with respect to the existing channel, transmission bandwidth may be extended by a total of 6 MHz. When the existing and extended transmission frames have the same transmission parameters, the total transmission capacity may be twice that of the existing channel transmission frame. In another example, when the size of the extended bandwidth is set to 6 MHz for a high channel and is set to 6 MHz for a low channel with respect to the existing channel, transmission bandwidth may be extended by a total of 12 MHz. When the existing subframe and the extended subframe have the same transmission parameters, the transmission capacity is three times as large as that of the existing channel transmission frame. In a further example, when the size of the extended bandwidth is set to 12 MHz for a high channel and is set to 6 MHz for a low channel with respect to the existing channel, transmission bandwidth may be extended by a total of 18 MHz. When the above method is used, the transmission bandwidth may be independently and freely extended, regardless of the size of the bandwidth of the existing channel.

Figure 8:
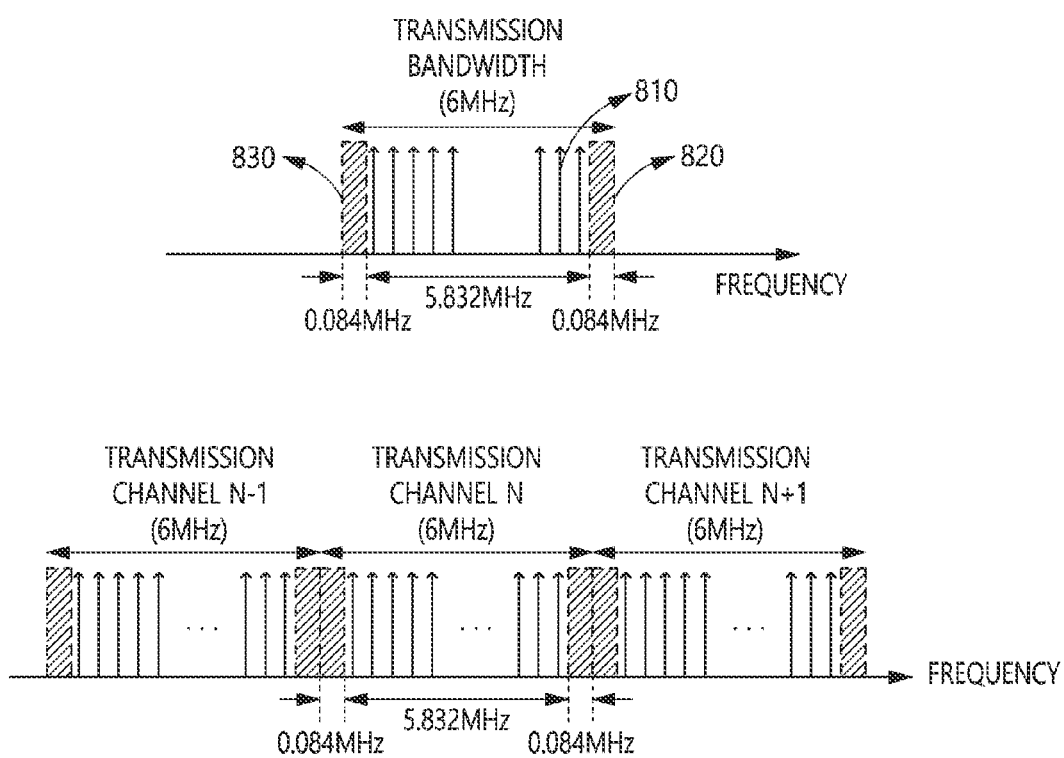
FIG. 8 is a diagram illustrating subcarriers of a conventional ATSC 3.0 broadcasting system.

FIG. 8 is a diagram illustrating subcarriers of a conventional ATSC 3.0 broadcasting system.

With reference to FIG. 8, an example (upper) in which one existing transmission channel is used in the ATSC 3.0 broadcasting system and an example (lower) in which three existing transmission channels are used will be described.

The ATSC 3.0 or OFDM-based broadcasting system is composed of multiple subcarriers from the standpoint of frequency. The OFDM-based broadcasting system uses an orthogonal frequency division multiplexing scheme, and transmits data after dividing a frequency band into narrowband subcarriers (subchannels) through a Fourier transform. In the case of an 8K transmission mode, 8196 subcarriers having a Fast Fourier Transform (FFT) size are generated within the transmission bandwidth. In detail, the 81% subcarriers are divided into effective subcarriers on which data is transmitted and null subcarriers on which data is not actually transmitted. In the 8K transmission mode, the ATSC 3.0 system provides the numbers of effective subcarriers, that is, 6913, 6817, 6721, 6625, and 6529, respectively, corresponding to a total of five types of effective subcarriers. Accordingly, of the total transmission bandwidth of 6 MHz, frequency bandwidths corresponding to effective subcarriers on which actual data is transmitted are provided as 5.832, 5.751, 5.670, 5.589, and 5.508 MHz, respectively, corresponding to a total of five types. The remaining null subcarriers, other than effective subcarriers, among all of the subcarriers, correspond to guard bands. For example, when the frequency bandwidth of effective data is 5.832 MHz, the bandwidth of each of the guard bands on both sides of the frequency bandwidth of the effective data is 0.084 MHz.

In FIG. 8, when the case where one existing transmission channel is used is considered, the bandwidth of the existing transmission channel is 6 MHz and multiple effective subcarriers 810 are located in an effective frequency band of 5.832 MHz. Further, in a right guard band 820 and a left guard band 830, effective subcarriers are not present.

In FIG. 8, when the case where three existing transmission channels are used is considered, transmission channel N−1, transmission channel N, and transmission channel N+1 are used. In this case, the total bandwidth of the transmission channels is 6×3=18 MHz, the total bandwidth of effective data is 5.832×3=17.496 MHz, and the total bandwidth of the guard bands is 0.084×6=0.504 MHz.

In this way, in the conventional ATSC 3.0 broadcasting system or OFDM broadcasting system, guard bands are present on both sides of frequencies for each transmission channel, and thus frequency bands corresponding to the guard bands cannot be utilized.

Figure 9:
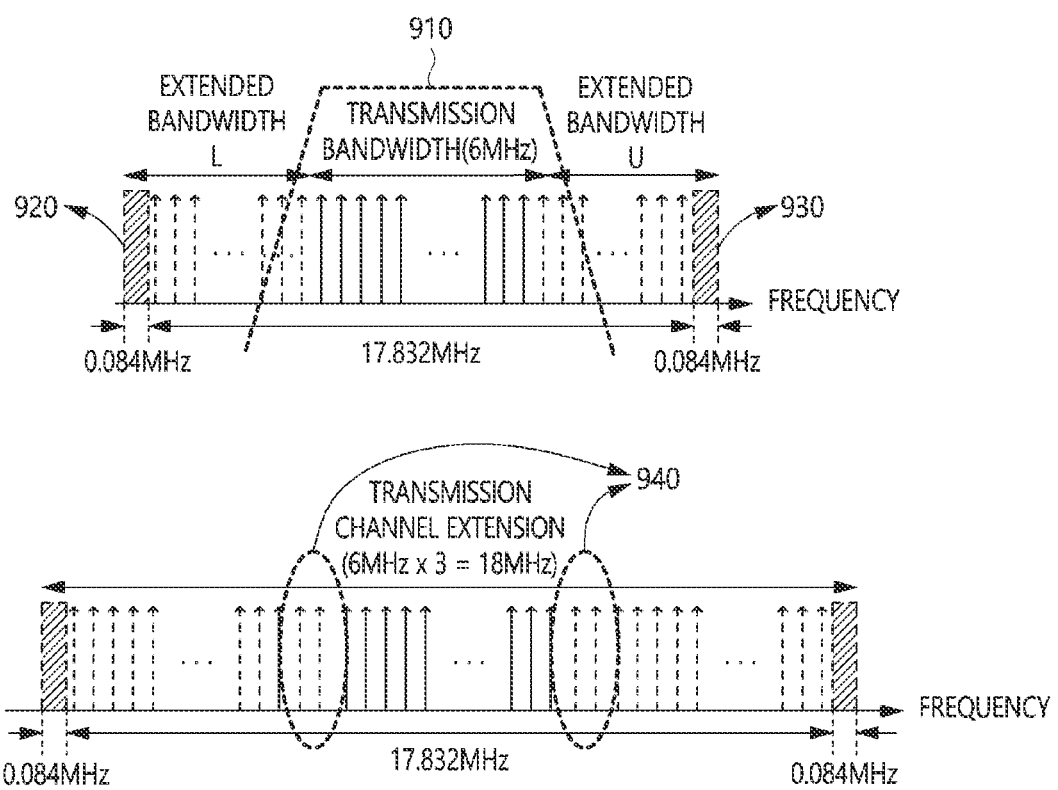
FIG. 9 is a diagram illustrating subcarriers of an OFDM-based broadcasting system according to an embodiment.

FIG. 9 is a diagram illustrating subcarriers of an OFDM-based broadcasting system according to an embodiment.

With reference to FIG. 9, an example (upper) in which extended bandwidths are applied to an existing transmission channel in the OFDM-based broadcasting system according to an embodiment and an example (lower) in which a transmission channel extended twice is additionally applied to the existing transmission channel will be described.

The ATSC 3.0 or OFDM-based broadcasting system is configured using multiple subcarriers from the standpoint of frequency. In FIG. 9, (effective) subcarriers are indicated by vertical solid arrows. Here, (effective) subcarriers added to a high channel (extended bandwidth U) and to a low channel (extended bandwidth L) are indicated by vertical dotted arrows.

As proposed in the present invention, when an extended bandwidth is applied, guard bands are not required in an existing transmission bandwidth, and only a guard band 920 located in the extended bandwidth L and a guard band 930 located in the extended bandwidth U are required, and thus the total bandwidth of the guard bands is only 0.084×2=0.168 MHz. This shows that the frequency bandwidth of the effective subcarriers on which actual data is transmitted is increased by 17.832 MHz.

Further, although the transmission apparatus for the OFDM-based broadcasting system according to the present invention transmits data by extending the transmission capacity in this way, an existing receiver may receive only signals of a portion marked as an existing receiver filter 910, thus maintaining reverse compatibility.

The lower drawing in FIG. 9 illustrates an example in which a transmission channel extended twice is added to the existing transmission channel. The total transmission bandwidth including the extended bandwidth is 18 MHz, an effective bandwidth is 17.832 MHz, and the bandwidth of guard bands is 0.168 MHz. When a frequency bandwidth of 6×3=18 MHz including the extended bandwidth is used, the total size of the guard bands may be reduced by 0.168×2=0.336 MHz compared to the case where three existing transmission channels are used. Further, the subcarriers 940 may be added to the bandwidth extended from the frequency bandwidth of effective data of 5.832 MHz. When the extended transmission bandwidth is 6 MHz for a high channel and is 6 MHz for a low channel, the number of (effective) subcarriers to be added to the high channel and the low channel may be greater than a maximum of 6913× 2=13826. That is, in the case of an 8K transmission mode of the ATSC 3.0 system, a number of effective subcarriers corresponding to a maximum of 398 (=6913×0.168/5.832×2) may be further added.

Figure 10:
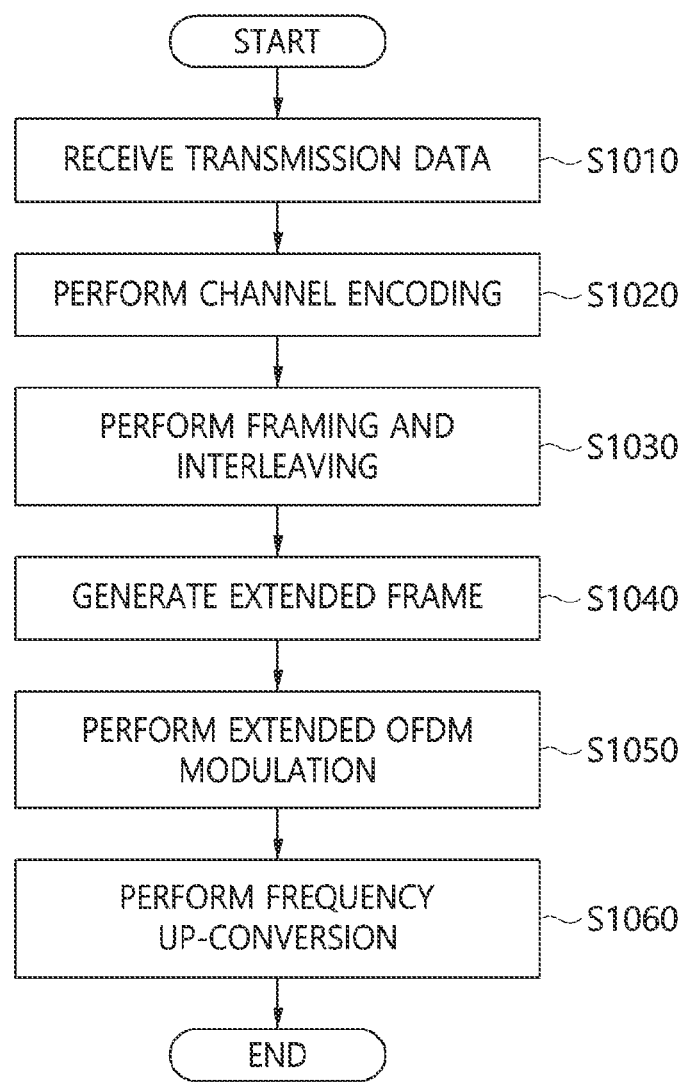
FIG. 10 is an operation flowchart illustrating an example of a transmission/reception method for an OFDM-based broadcasting system according to an embodiment.

FIG. 10 is an operation flowchart illustrating an example of a transmission/reception method for an OFDM-based broadcasting system according to an embodiment.

Referring to FIG. 10, multiple transmission frame generation units of the transmission apparatus for the OFDM-based broadcasting system according to the embodiment generate multiple transmission frames by receiving multiple pieces of transmission data, respectively.

The data input unit of each of the transmission frame generation units receives the corresponding transmission data at step S1010. The channel-encoding unit of each of the transmission frame generation units performs channel encoding on the received transmission data and then generates encoded data at step S1020. The framing and interleaving unit of each of the transmission frame generation units generates the corresponding transmission frame by framing and interleaving the encoded data at step S1030.

The extended frame combination unit of the transmission apparatus generates an extended frame by combining the multiple transmission frames generated by the multiple transmission frame generation units so that the transmission frames are adjacent to each other based on frequency at step S1040.

Here, as described above with reference to FIGS. 6 and 7, the extended frame has a form in which a high channel transmission frame and a low channel transmission frame are added to an existing channel transmission frame. Alternatively, the extended frame may have a form in which one or more high channel extended transmission frames and one or more low channel extended transmission frames are further added.

Next, the extended OFDM modulation unit of the transmission apparatus performs OFDM-modulation on the extended frame and then generates a modulated signal at step S1050.

Here, as described above with reference to FIG. 9, the modulated signal may be composed of multiple subcarriers based on frequency, effective subcarriers, among the subcarriers, may be added to the frequency guard bands of the existing channel transmission frame, and the number of subcarriers of signals modulated from the high channel transmission frame and the low channel transmission frame may be increased by the ratio of the frequency guard bands to the effective frequency band of the existing channel transmission frame.

Further, the frequency up-conversion unit of the transmission apparatus performs frequency up-conversion on the modulated signal and then generates a transmission signal at step S1060. The transmission signal generated in this way is provided to and transmitted through the transmission antenna.

Figure 11:
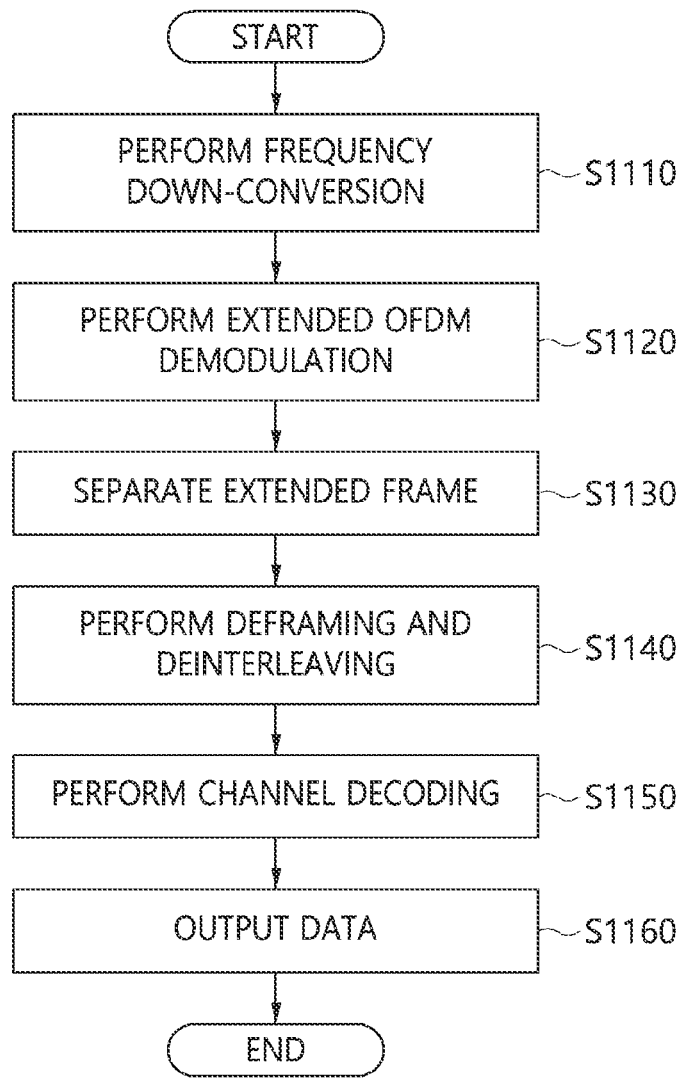
FIG. 11 is an operation flowchart illustrating another example of a transmission/reception method for an OFDM-based broadcasting system according to an embodiment.

FIG. 11 is an operation flowchart illustrating another example of a transmission/reception method for an OFDM-based broadcasting system according to an embodiment.

Referring to FIG. 11, the frequency down-conversion unit of the reception apparatus for the OFDM-based broadcasting system according to the embodiment performs frequency down-conversion on a signal received from a reception antenna at step S1110.

Here, the frequency down-converted signal generated by the frequency down-conversion unit corresponds to the signal modulated by the extended OFDM modulation unit of the transmission apparatus for the OFDM-based broadcasting system according to the embodiment. That is, the frequency down-converted signal may be composed of multiple subcarriers based on the frequency, effective subcarriers, among the subcarriers, may be added to the frequency guard bands of an existing channel transmission frame, and the number of subcarriers of signals modulated from the high channel transmission frame and the low channel transmission frame may be increased by the ratio of the frequency guard bands to the effective frequency band of the existing channel transmission frame.

The extended OFDM demodulation unit of the reception apparatus performs OFDM demodulation on the frequency down-converted signal and generates a demodulated extended frame at step S1120.

Further, the extended frame demodulated by the extended OFDM demodulation unit corresponds to the extended frame generated by the extended frame combination unit of the transmission apparatus for then OFDM-based broadcasting system. That is, the demodulated extended frame may have a form in which the high channel transmission frame and the low channel transmission frame are added to the existing channel transmission frame. Alternatively, the demodulated extended frame may have a form in which one or more high channel extended transmission frames and one or more low channel extended transmission frames are further added.

The extended frame separation unit of the reception apparatus separates the demodulated extended frame into multiple transmission frames based on a frequency band at step S1130.

That is, the extended frame separation unit 330 separates an existing channel transmission frame, a high channel transmission frame, a low channel transmission frame, one or more high channel extended transmission frames, and one or more low channel extended transmission frames from the demodulated extended frame based on the frequency band. The transmission frames separated in this way are input to respective reception data reconstruction unit 330 and are reconstructed into reception data.

The reception data reconstruction units of the reception apparatus reconstructs the multiple separated transmission frames into multiple pieces of reception data, and the deframing and interleaving units of the reception data reconstruction units generate deframed data by deframing and deinterleaving the transmission frames at step S1140. The channel-decoding units of the reception data reconstruction units decode the deframed data at step S1150. The data output units of the reception data reconstruction units output the decoded data as reception data at step S1160.

Figure 12:
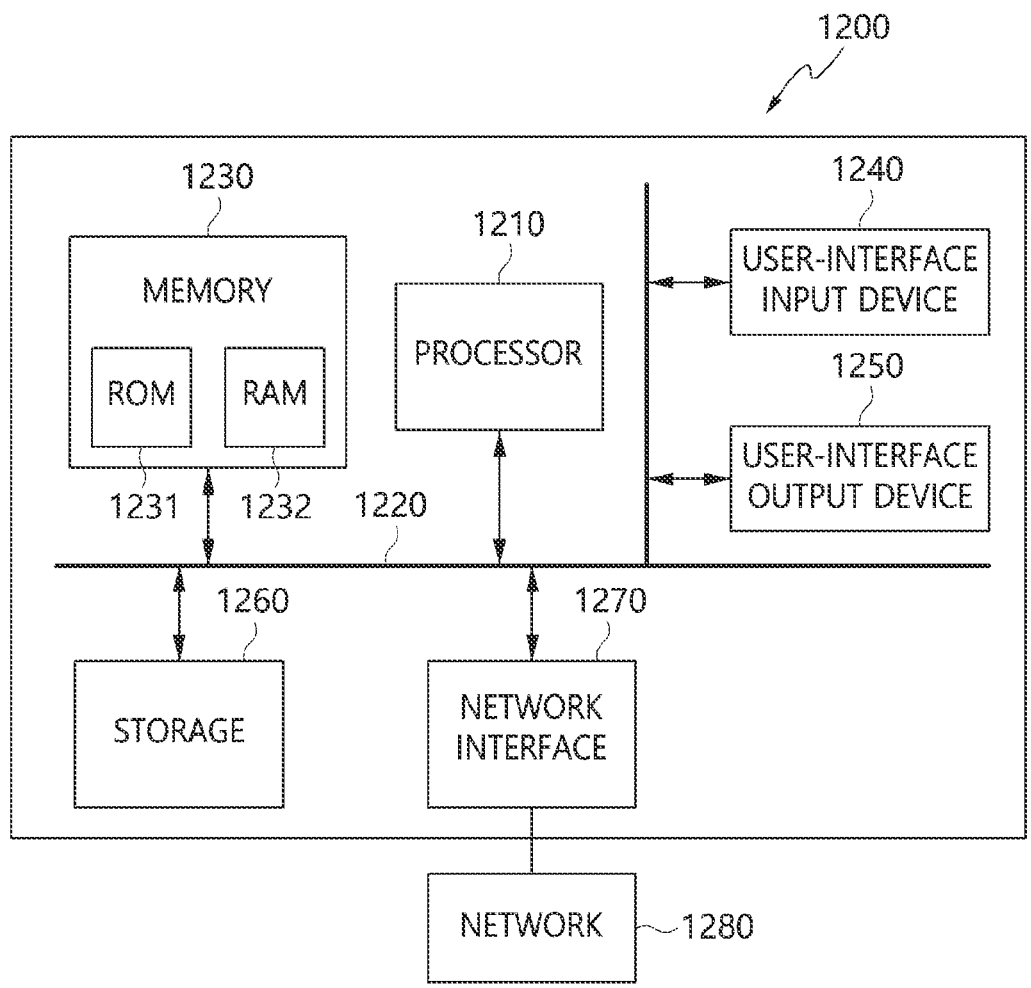
FIG. 12 is a diagram illustrating the configuration of a computer system according to an embodiment.

FIG. 12 is a diagram illustrating the configuration of a computer system according to an embodiment.

A transmission apparatus and a reception apparatus for an OFDM-based broadcasting system according to an embodiment may be implemented in a computer system 1200, such as a computer-readable storage medium.

The computer system 1200 may include one or more processors 1210, memory 1230, a user interface input device 1240, a user interface output device 1250, and storage 1260, which communicate with each other through a bus 1220. The computer system 1200 may further include a network interface 1270 connected to a network 1280. Each processor 1210 may be a Central Processing Unit (CPU) or a semiconductor device for executing programs or processing instructions stored in the memory 1230 or the storage 1260. Each of the memory 1230 and the storage 1260 may be a storage medium including at least one of a volatile medium, a nonvolatile medium, a removable medium, a non-removable medium, a communication medium, and an information delivery medium. For example, the memory 1230 may include Read-Only Memory (ROM) 1231 or Random Access Memory (RAM) 1232.

In accordance with the above-described embodiments, the present invention can provide a transmission apparatus and a reception apparatus for an OFDM-based broadcasting system and a method using the transmission apparatus and the reception apparatus, thus enabling an apparatus and method that increase transmission capacity while guaranteeing reverse compatibility with an existing receiver to be provided.

Further, the present invention can provide a transmission/reception apparatus and method for an OFDM-based broadcasting system, which allow an existing receiver to be provided with existing transmission capacity and also allow a new receiver to be provided with added transmission capacity in addition to the existing transmission capacity while providing a method that is capable of increasing transmission capacity based on ATSC 3.0 which is a next-generation broadcasting system.

According to the present invention, there can be provided an apparatus and method that increase transmission capacity without limitation while guaranteeing reverse compatibility with an existing receiver in an OFDM-based broadcasting system.

Further, according to the present invention, there can be provided a transmission/reception apparatus and method for an OFDM-based broadcasting system, which allow an existing receiver to be provided with existing transmission capacity and also allow a new receiver to be provided with added transmission capacity in addition to the existing transmission capacity while providing a method that is capable of increasing transmission capacity based on ATSC 3.0, which is a next-generation broadcasting system.

Although the embodiments of the present invention have been disclosed, those skilled in the art will appreciate that the present invention can be implemented in other concrete forms, without departing from the technical spirit or essential features of the invention as disclosed in the accompanying claims. Therefore, it should be understood that the above-described embodiments are only exemplary in all aspects, rather than being restrictive.

What is claimed is:

1. A transmission apparatus for an Orthogonal Frequency Division Multiplexing (OFDM)-based broadcasting system, comprising:
    multiple transmission frame generation units for generating multiple transmission frames from multiple pieces of transmission data;
    an extended frame combination unit for generating an extended frame by combining the multiple transmission frames so that the multiple transmission frames are adjacent to each other based on a frequency;
    an extended OFDM modulation unit for modulating the extended frame and then generating a modulated signal; and
    a frequency up-conversion unit for performing frequency up-conversion on the modulated signal and then generating a transmission signal,
    wherein each of the transmission frame generation units comprises:
        a data input unit for receiving a corresponding one of the multiple pieces of transmission data;
        a channel-encoding unit for encoding the received transmission data and then generating encoded data; and
        a framing and interleaving unit for framing and interleaving the encoded data and then generating a transmission frame, and
    wherein the multiple transmission frame generation units comprise:
        an existing channel transmission frame generation unit for generating an existing channel transmission frame;
        a high channel transmission frame generation unit for generating a high channel transmission frame; and
        a low channel transmission frame generation unit for generating a low channel transmission frame to be paired with the high channel transmission frame, and
    wherein the extended OFDM modulation unit adds subcarriers of the modulated signal to a guard band of the existing channel transmission frame.

2. The transmission apparatus of claim 1, wherein the extended frame combination unit is configured to:
    generate the high channel transmission frame to be located in a portion that is adjacent to the existing channel transmission frame with respect to a frequency and that has a frequency higher than a frequency of a frequency band of the existing channel transmission frame, and
    generate the low channel transmission frame to be located in a portion that is adjacent to the existing channel transmission frame with respect to a frequency and that has a frequency lower than a frequency of the frequency band of the existing channel transmission frame.

3. The transmission apparatus of claim 2, wherein the multiple transmission frame generation units further comprise:
    one or more high channel extended transmission frame generation units for generating one or more high channel extended transmission frames; and
    one or more low channel extended transmission frame generation units for generating one or more low channel extended transmission frames to be paired with the one or more high channel extended transmission frames.

4. The transmission apparatus of claim 3, wherein the extended frame combination unit is configured to:
    generate the one or more high channel extended transmission frames to be sequentially located in portions that are adjacent to the high channel transmission frame with respect to a frequency and that have frequencies higher than a frequency of a frequency band of the high channel transmission frame, and
    generate the one or more low channel extended transmission frames to be sequentially located in portions that are adjacent to the low channel transmission frame with respect to a frequency and that have frequencies lower than a frequency of a frequency band of the lower channel transmission frame.

5. The transmission apparatus of claim 1,
    wherein the extended OFDM modulation unit increases a number of subcarriers of signals modulated from the high channel transmission frame and the low channel transmission frame by a ratio of a frequency guard band to an effective frequency band of the existing channel transmission frame.

6. The transmission apparatus of claim 5, wherein the extended frame combination unit is configured to:
    fill a preamble time interval and a bootstrap time interval of the high channel transmission frame with dummy modulation values, and fill a preamble time interval and a bootstrap time interval of the low channel transmission frame with dummy modulation values.

7. The transmission apparatus of claim 1, wherein the extended frame combination unit is configured to:
   fill a bootstrap time interval of the high channel transmission frame with dummy modulation values, and
   fill a bootstrap time interval of the low channel transmission frame with dummy modulation values.

8. A transmission/reception method for an OFDM-based broadcasting system, comprising:
   generating multiple transmission frames from multiple pieces of transmission data;
   generating an extended frame by combining the multiple transmission frames so that the multiple transmission frames are adjacent to each other based on a frequency;
   modulating the extended frame and then generating a modulated signal; and
   performing frequency up-conversion on the modulated signal and then generating a transmission signal,
   wherein generating each of the multiple transmission frames comprises:
      receiving a corresponding one of the multiple pieces of transmission data;
      encoding the received transmission data and then generating encoded data; and
      framing and interleaving the encoded data and then generating a transmission frame, and
   wherein generating the multiple transmission frames comprises:
      generating an existing channel transmission frame;
      generating a high channel transmission frame; and
      generating a low channel transmission frame to be paired with the high channel transmission frame, and
   wherein generating the modulated signal is configured to add subcarriers of the modulated signal to a guard band of the existing channel transmission frame.

9. The transmission/reception method of claim 8, wherein generating the extended frame comprises:
   generating the high channel transmission frame to be located in a portion that is adjacent to the existing channel transmission frame with respect to a frequency and that has a frequency higher than a frequency of a frequency band of the existing channel transmission frame, and
   generating the low channel transmission frame to be located in a portion that is adjacent to the existing channel transmission frame with respect to a frequency and that has a frequency lower than a frequency of the frequency band of the existing channel transmission frame.

10. The transmission/reception method of claim 9, wherein generating the multiple transmission frames further comprise:
   generating one or more high channel extended transmission frames; and
   generating one or more low channel extended transmission frames to be paired with the one or more high channel extended transmission frames.

11. The transmission/reception method of claim 10, wherein generating the extended frame comprises:
   generating the one or more high channel extended transmission frames to be sequentially located in portions that are adjacent to the high channel transmission frame with respect to a frequency and that have frequencies higher than a frequency of a frequency band of the high channel transmission frame; and
   generating the one or more low channel extended transmission frames to be sequentially located in portions that are adjacent to the low channel transmission frame with respect to a frequency and that have frequencies lower than a frequency of a frequency band of the lower channel transmission frame.

12. The transmission/reception method of claim 8, wherein generating the modulated signal is configured to increase a number of subcarriers of signals modulated from the high channel transmission frame and the low channel transmission frame by a ratio of a frequency guard band to an effective frequency band of the existing channel transmission frame.

13. The transmission/reception method of claim 12, wherein generating the extended frame further comprises:
   filling a preamble time interval and a bootstrap time interval of the high channel transmission frame with dummy modulation values; and
   filling a preamble time interval and a bootstrap time interval of the low channel transmission frame with dummy modulation values.

14. The transmission/reception method of claim 8, wherein generating the extended frame further comprises:
   filling a bootstrap time interval of the high channel transmission frame with dummy modulation values; and
   filling a bootstrap time interval of the low channel transmission frame with dummy modulation values.

15. The transmission/reception method of claim 8, further comprising:
   performing frequency down-conversion on a signal received from an antenna;
   demodulating a frequency down-converted signal and then generating a demodulated extended frame;
   separating the demodulated extended frame into multiple transmission frames based on a frequency band; and
   reconstructing the multiple transmission frames into multiple pieces of reception data,
   wherein reconstructing the multiple transmission frames into the multiple pieces of reception data comprises:
      deframing and deinterleaving a corresponding transmission frame and then generating deframed data;
      decoding the deframed data and then generating decoded data; and
      outputting the decoded data as reception data.

16. A reception apparatus for an OFDM-based broadcasting system, comprising:
   a frequency down-conversion unit for performing frequency down-conversion on a signal received from a reception antenna;
   an extended OFDM demodulation unit for demodulating a frequency down-converted signal and then generating a demodulated extended frame;
   an extended frame separation unit configured to separate the demodulated extended frame into multiple transmission frames based on a frequency band; and
   multiple reception data reconstruction units for reconstructing the multiple transmission frames into multiple pieces of reception data,
   wherein each of the multiple reception data reconstruction units comprises:
      a deframing and deinterleaving unit for deframing and deinterleaving a corresponding transmission frame and then generating deframed data;
      a channel-decoding unit for decoding the deframed data and then generating decoded data;

a data output unit for outputting the decoded data as reception data, and wherein the frequency down-converted signal is composed of multiple subcarriers based on the frequency, wherein effective subcarriers among the subcarriers may be added to the frequency guard bands of an existing channel transmission frame, and wherein the demodulated extended frame may have a form in which a high channel transmission frame and a low channel transmission frame are added to the existing channel transmission frame.

\* \* \* \* \*